US008534231B2

(12) United States Patent
Hakes et al.

(10) Patent No.: US 8,534,231 B2
(45) Date of Patent: Sep. 17, 2013

(54) BOVINE GERMICIDE APPLICATION TECHNOLOGY

(76) Inventors: Dennis Lee Hakes, Burley, ID (US);
Jean Ann Hakes, Burley, ID (US)

( * ) Notice: Subject to any disclaimer, the term of this patent is extended or adjusted under 35 U.S.C. 154(b) by 323 days.

(21) Appl. No.: 12/895,582

(22) Filed: Sep. 30, 2010

(65) Prior Publication Data
US 2011/0083612 A1 Apr. 14, 2011

Related U.S. Application Data

(60) Provisional application No. 61/247,431, filed on Sep. 30, 2009.

(51) Int. Cl.
*A01K 29/00* (2006.01)
(52) U.S. Cl.
USPC .......................... 119/660; 119/652; 15/104.92
(58) Field of Classification Search
USPC .............. 119/652, 650, 14.23, 664, 673, 670, 119/14.47, 658, 660, 663, 665, 666, 671; 15/104.92
See application file for complete search history.

(56) References Cited

U.S. PATENT DOCUMENTS

| | | | | | |
|---|---|---|---|---|---|
| 2,599,446 | A | * | 6/1952 | Greene | 222/205 |
| 3,366,111 | A | * | 1/1968 | Gandier | 604/310 |
| 4,970,992 | A | * | 11/1990 | Aiken | 119/673 |
| 5,379,724 | A | * | 1/1995 | Dee et al. | 119/673 |
| 5,535,700 | A | | 7/1996 | Boudreau | |
| 5,722,350 | A | * | 3/1998 | Marshall | 119/673 |
| 7,165,510 | B2 | * | 1/2007 | Hakes | 119/664 |
| 7,302,915 | B2 | * | 12/2007 | Leary et al. | 119/664 |
| 7,387,086 | B2 | * | 6/2008 | Hakes | 119/652 |
| 7,753,006 | B2 | * | 7/2010 | Hiley | 119/673 |
| 2002/0096541 | A1 | * | 7/2002 | Cross | 222/190 |
| 2006/0107904 | A1 | | 5/2006 | Hakes | |
| 2009/0084324 | A1 | * | 4/2009 | Hiley | 119/652 |
| 2010/0083903 | A1 | * | 4/2010 | Hiley et al. | 119/14.47 |

* cited by examiner

Primary Examiner — Kristen C Hayes
(74) Attorney, Agent, or Firm — Skinner and Associates

(57) ABSTRACT

An applicator has an outer body which holds a channeled insert which in turn channels teat disinfectant to the brushes by way of a annular reservoir contained within the periphery of the snap on top, the body of the apparatus is in turn connected to a squeezable bottle that acts as reservoir for the disinfectant supply and when squeezed delivers the disinfectant through the apparatus and onto the brushes. This apparatus and method of use therefor is concerned with the treatment of animal teats, especially although not necessarily exclusively in connection with a milking operation. The treatment involves the application of a disinfectant to the outer skin surfaces and in part to the teat orifice normally at the end of milking, although the invention can also be employed for a treatment as a preliminary step prior to milking.

20 Claims, 16 Drawing Sheets

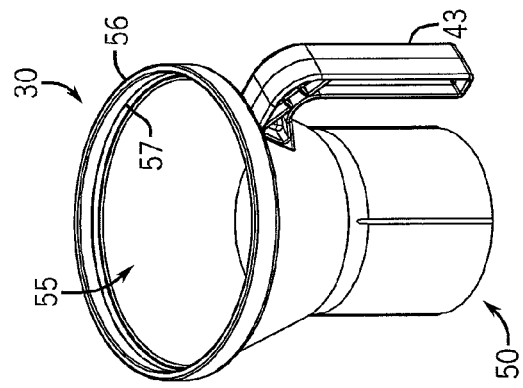
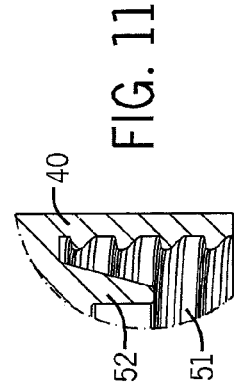
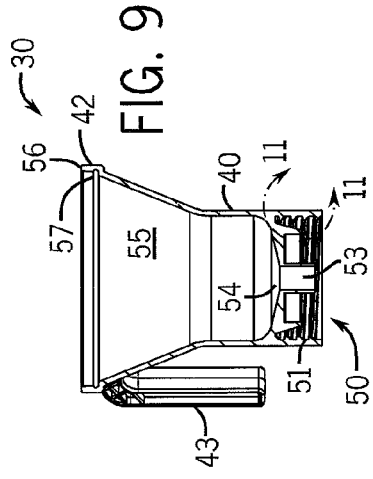
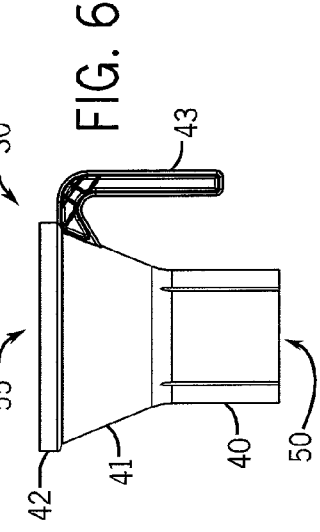
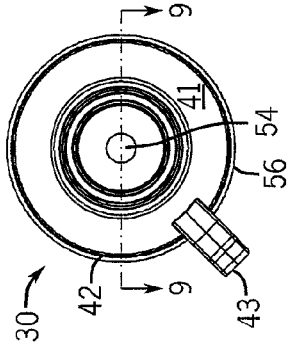
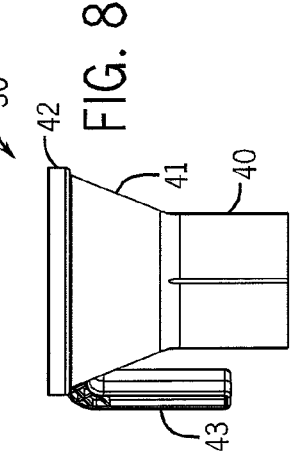
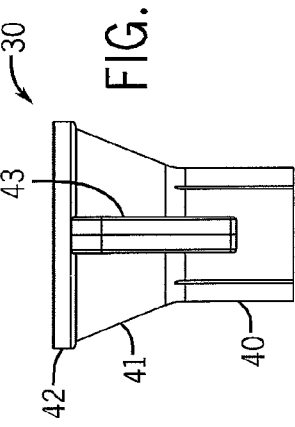

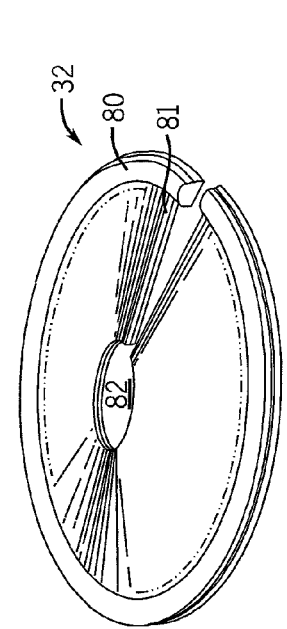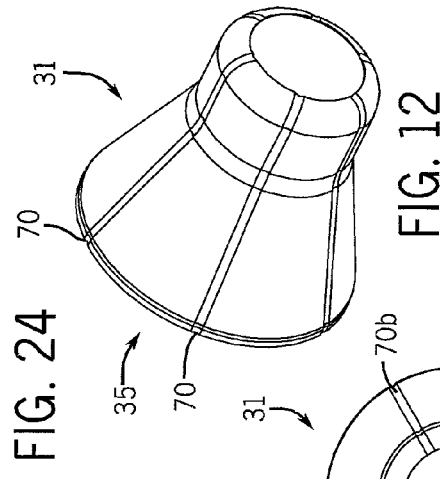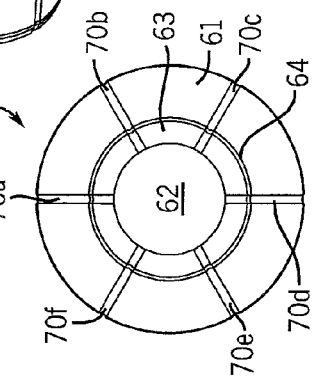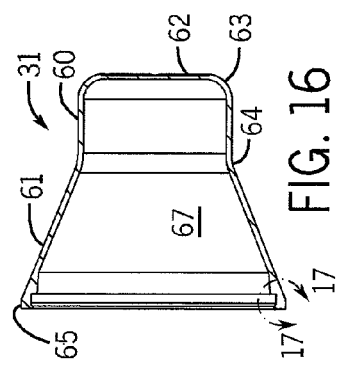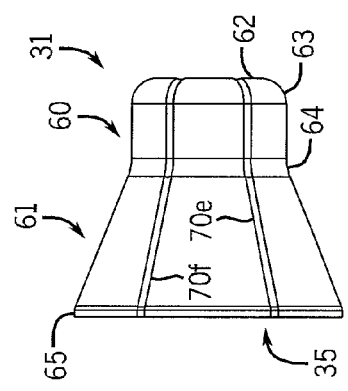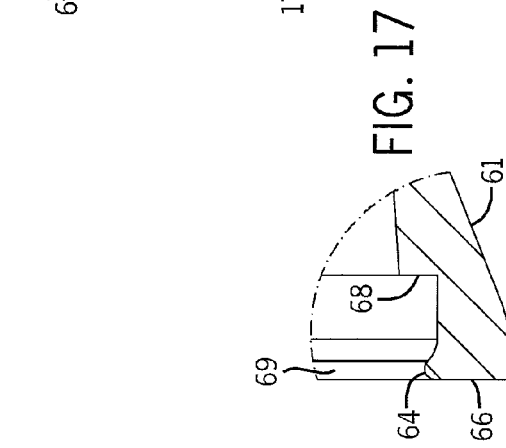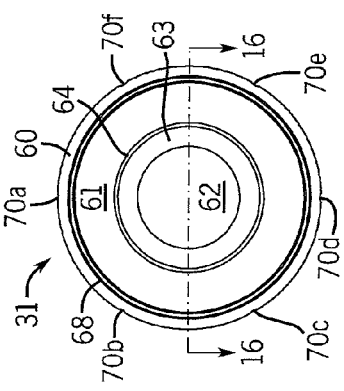

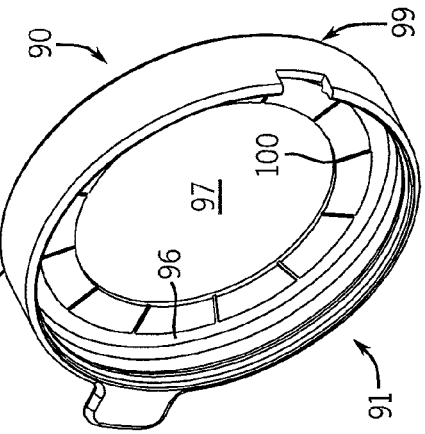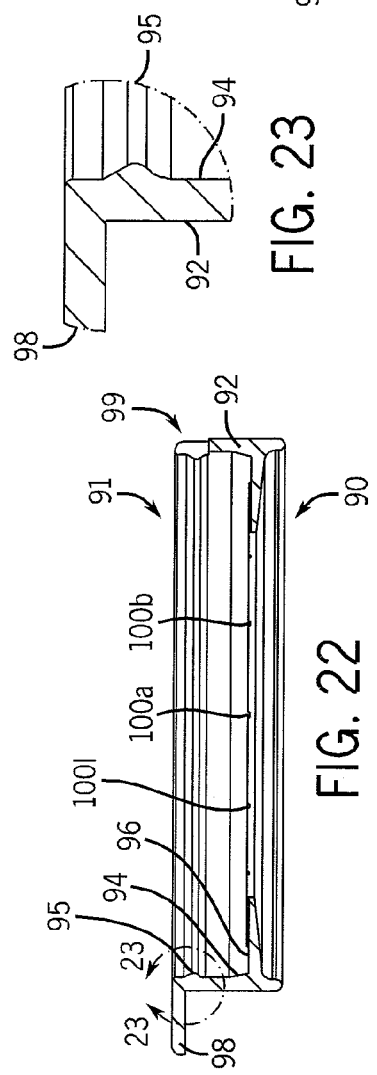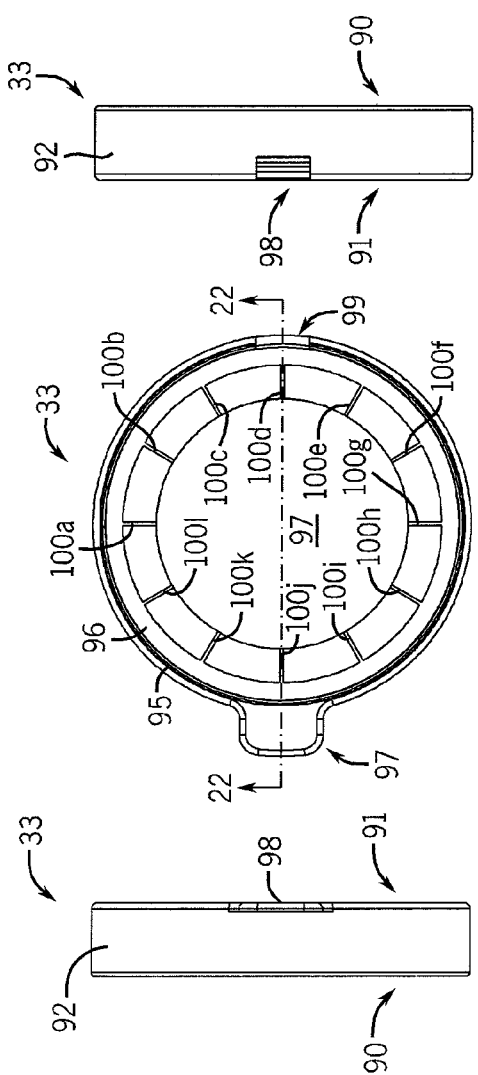

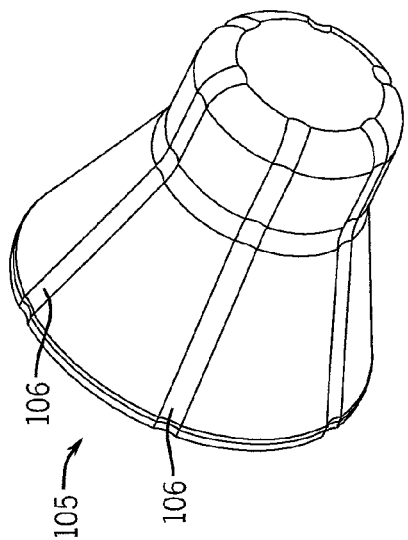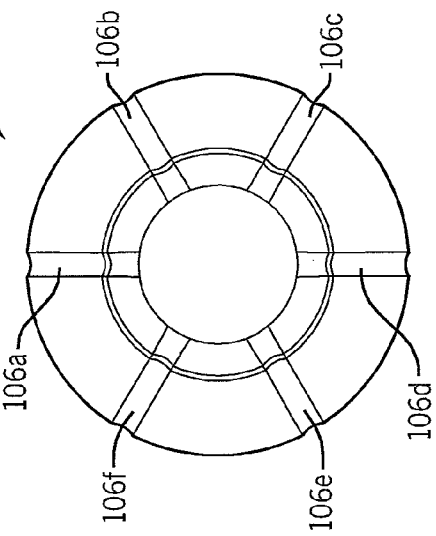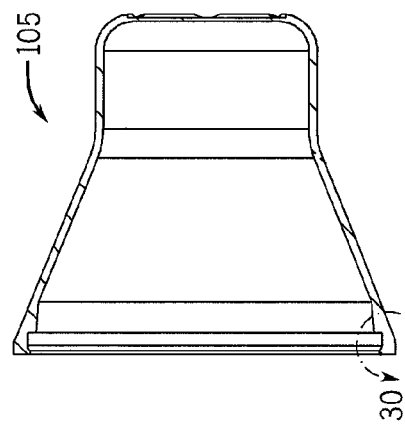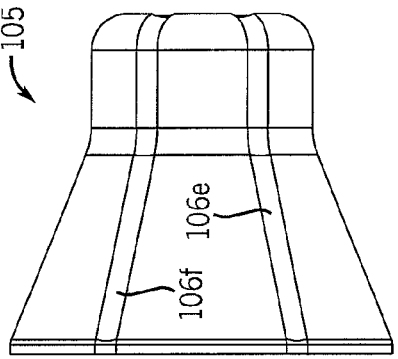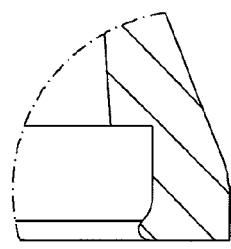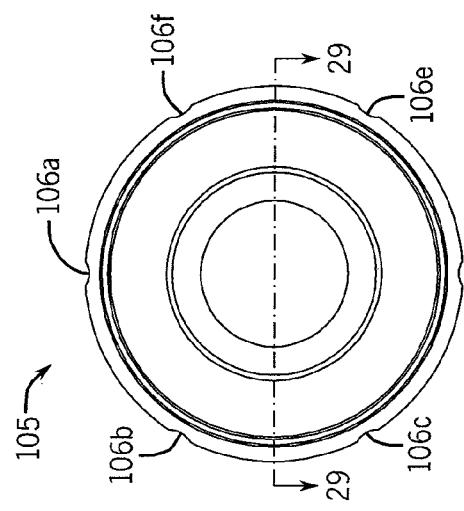

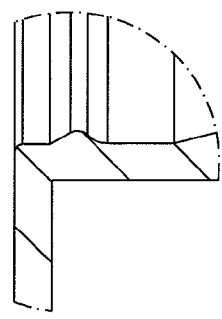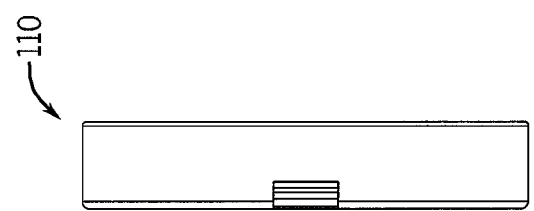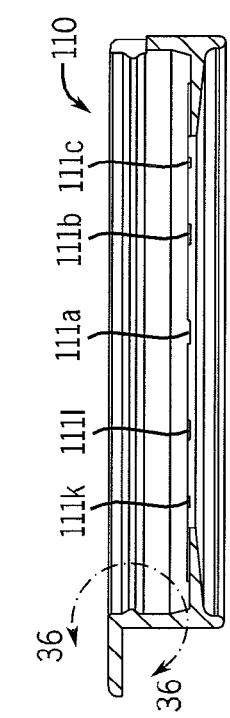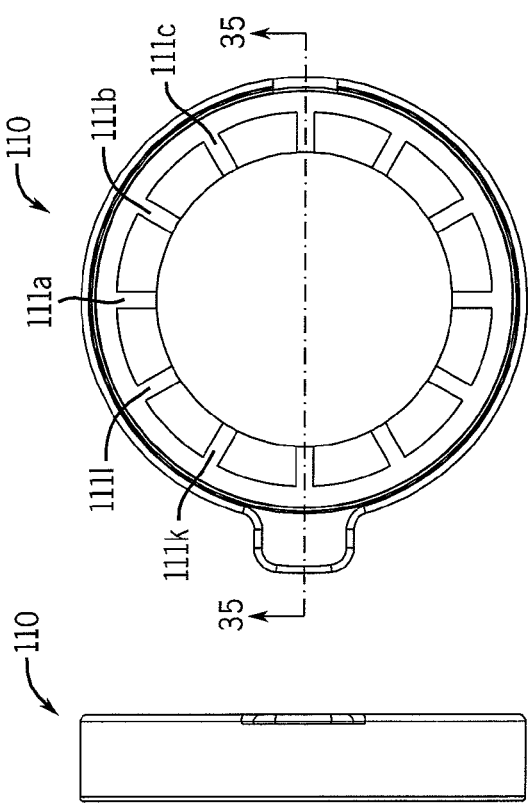

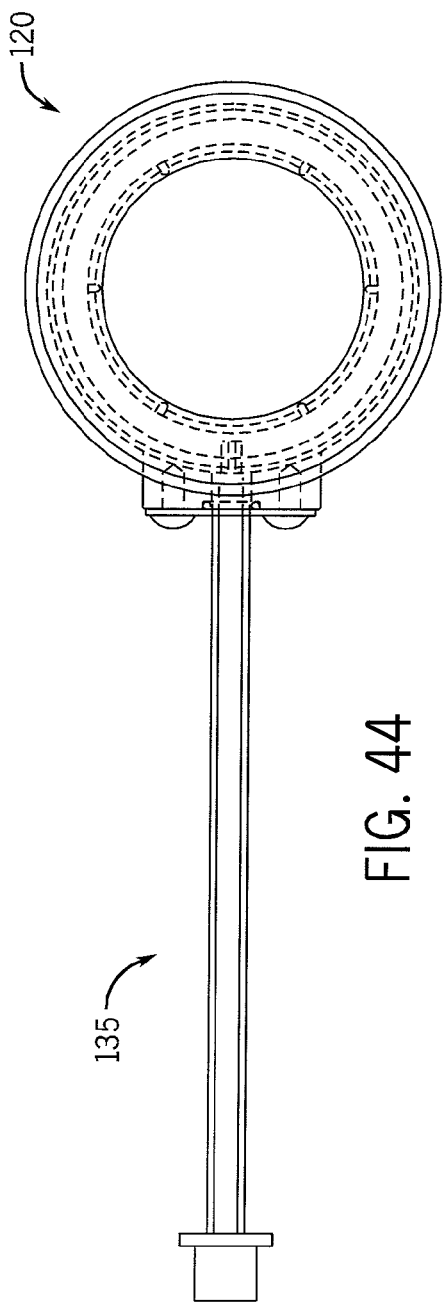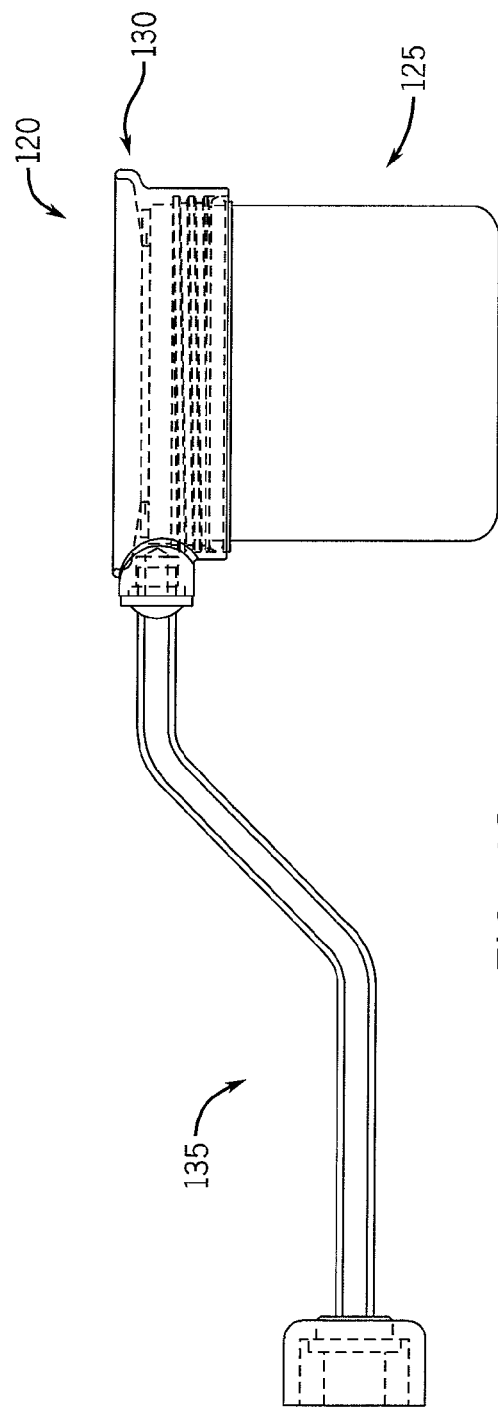
FIG. 44
FIG. 43

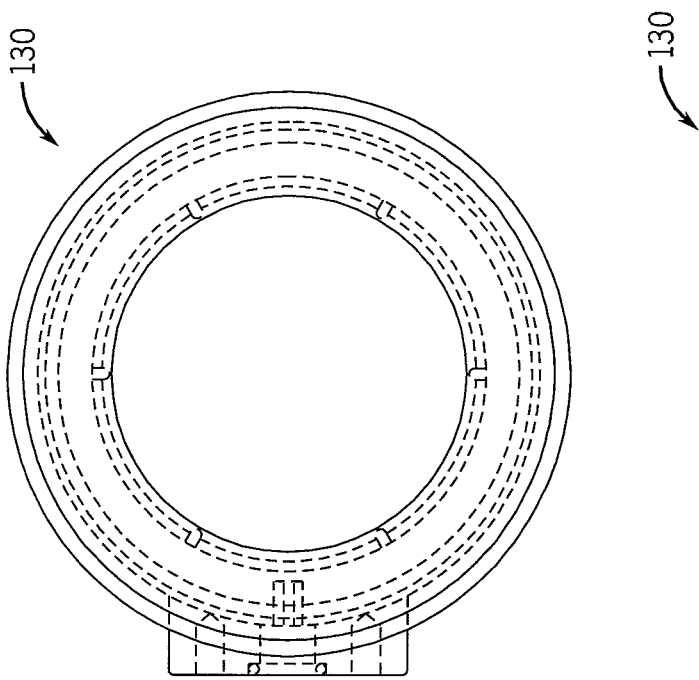
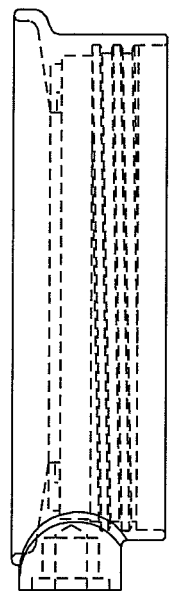
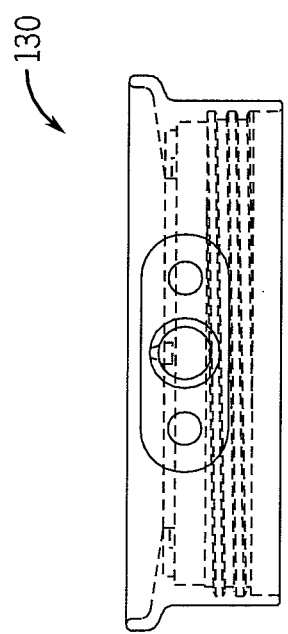
FIG. 48
FIG. 46
FIG. 47

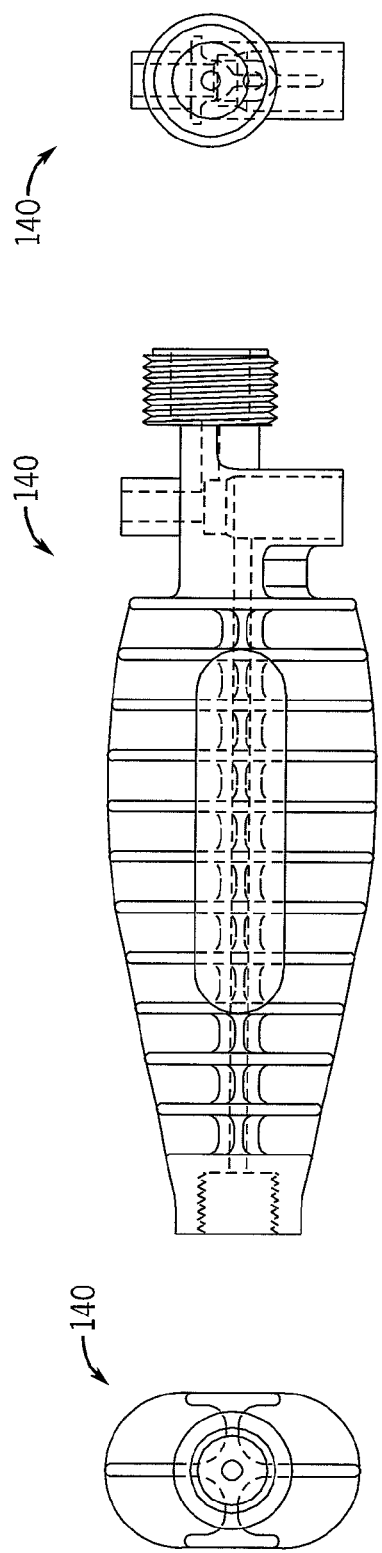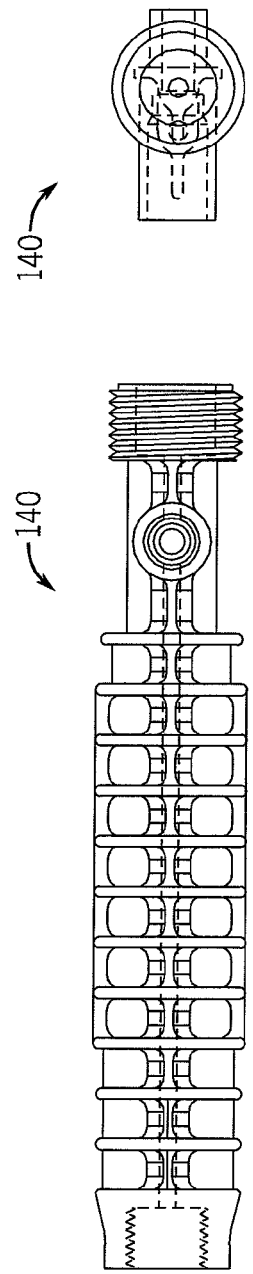
FIG. 51
FIG. 53
FIG. 49
FIG. 50
FIG. 52

BOVINE GERMICIDE APPLICATION TECHNOLOGY

CROSS-REFERENCE TO RELATED APPLICATIONS, IF ANY

This application claims the benefit under 35 U.S.C. §119(e) of U.S. Provisional Patent Application Ser. No. 61/247,431, filed Sep. 30, 2009, which is hereby incorporated by reference.

37 C.F.R. §1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to veterinary and animal care systems, apparatus and methods. Particularly, the invention relates to devices and method for supporting and maintaining proper care of udders and teats in lactating animals.

2. Background Information

For the health and safety of milk producing animals as well as those persons and animals that consume the milk products derived from these animals, the udders and teats of milk producing animals must be kept clean and healthy. This is particularly true in the bovine dairying industry where complications such as mastitis, swollen or cracked teats, and dirty and unclean teats can cause bacterial contamination of entire vats of milk. This contamination can render hundreds or even thousands of gallons of milk useless and can have severe economic effect on the dairyman who depends upon the sale of acceptable uncontaminated milk as a source of income. The economic impacts of contaminated or unacceptable milk can be devastating.

In order to prevent mastitis and other complications and to maintain a healthy milk supply, the care, cleaning and hygiene of the teats and udders of the animals being milked is of particular importance. In order to prevent the onset of mastitis, a variety of procedures are utilized to stimulate, clean and disinfect the teats of the animal. Most mastitis infections are related to conditions that expose the teat end to bacteria and to situations that make it easier for these bacteria to penetrate the teat canal. These bacteria then travel into the mammary gland where the infection causes an inflammatory response that can cause destruction of milk secreting cells as well as contaminating any of the milk that comes from these infected cows.

While various precautions have been taken to prevent the cow from developing mastitis, such as pre-washing, stripping, and sanitizing of the milking equipment, the most effective way of preventing the onset of mastitis involves the use of so called teat-dip to apply a germicide to the teat both prior to and after milking. The application of teat dip prior to milking typically requires that a teat be dipped into a cup having a germicidal solution. The teat is then coated and after about 30 seconds the germicide is dried off of the teat with a paper or cloth towel. This germicide destroys those microorganisms that contaminate the teat skin between milkings. After milking has been completed, the teats are again dipped into these cups and coated with a germicide. This germicide prevents the growth and proliferation of organisms that can cause mastitis.

The application of teat dip to the teat is of utmost importance. It is crucial that the entire teat be completely covered and that a residue is left on the teat so that the anti-microbial action is still present when the cow lies down in a free stall or any other place where sanitary conditions are less than ideal. Barrier teat dips generally contain germicides, skin conditioners and protective film so that the teat end is sealed from mastitis-causing bacteria. These barrier teat dips do inhibit bacterial multiplication on the teat skin under the film.

One of the known methods and devices for applying teat dip is to utilize a dip cup of a sprayer to coat the teat. The teat is typically dipped into the cup or sprayed so as to apply the germicide. This presents several problems. First, obtaining the proper coverage over the teat is not always accomplished, as the location of the germicide upon the teat is dependent upon the skill of the person applying the solution to the teat. Thus, locations or areas of the teat may not be covered and may be left exposed. These uncovered areas provide locations wherein bacteria can congregate and proliferate. When this occurs, the effectiveness of the teat dip as a whole has been compromised.

Both the dip and the spray method that exist in the prior art cause substantial amounts of waste to take place. This waste occurs as excess material does not adhere to the teat, falls off of the teat and on to the floor where it is subsequently washed away. This germicide is a highly corrosive material that can then cause various economic and environmental damage to the areas in which it contacts. This problem is exacerbated by the spreading of the wasted solution, which is then washed into ponds of manure pits, and then spread upon the ground. These germicides are hazardous to clean water and the raising of crops on the earth.

The economic impact of this waste is also great. The dairy industry has become extremely economically conservative because of low prices received for their product. Therefore, the ability to reduce waste is of great value. A gallon of post dip for example, varies in price from between $5 and $15 dollars per gallon. A typical 1,000-head milking herd may require an average of about 350 gallons per month. Thus, the cost of utilizing this dip may be between about $1,750 and $5,250 per month. The ability to reduce this cost would greatly benefit a user and could provide, in some instances, the difference between a farm surviving or failing.

Existing technology also includes U.S. Pat. No. 7,165,510 entitled Bovine Germicide Application Device and U.S. Pat. No. 7,387,086 entitled Bovine Germicide Application Device and Method of applicant(s).

All US patents and patent applications, and all other published documents mentioned anywhere in this application are incorporated by reference in their entirety.

BRIEF SUMMARY OF THE INVENTION

The invention provides bovine germicide application apparatus and method which are practical, reliable, accurate and efficient, and which are believed to fulfill the need and to constitute an improvement over the background technology.

The largest and most expensive challenge to milk producing farms is a disease called mastitis. Mastitis is caused by unsanitary conditions, especially during the milking process. Bacteria can easily enter the teat during the harvesting of the milk. A pre-dip of germicide is applied to the skin of the teat prior to the milking process to kill the bacteria that is on the skin of the teat. After the germicide has had sufficient contact time with the skin of the teat to kill all bacteria the germicide is wiped from the teat. The milk is then harvested and a post dip is then applied to the skin of the teat to kill all milk cells left behind from harvesting and leave a protective coating of germicide on the entire surface of the teat. 100% skin coverage of the teat is required to reduce the chances of mastitis for both pre and post dipping. The dairy industry is suffering through the worst financial crisis in history. With the serious economic conditions dairymen are facing the bacteria laden environmental conditions that the female lactating animal lives in, the apparatus and method of the invention solves both problems. It provides substantially 100% skin coverage by the germicide and reduces the amount used to 0.04 ounces per cow. For example, the 1,000 cow dairy, milking 2 times per day, using the standard open top dipper uses 450 gallons of pre and post germicide per month. The 1,000 cow dairy milking 2 times per day using the invention gets 100% skin coverage and uses only 80 gallons of pre and post germicide per month. This is a savings of 315 gallons per month at an average cost of $6.00 per gallon or $870.00 per month or $10,440.00 per year.

In one aspect the invention provides an apparatus comprising a body having an interior cavity, an article ingress/egress aperture, a material input and at least one channel for conveying material from the material input to the article ingress/egress aperture, and a wiping element disposed near the article ingress/egress aperture, the wiping element receiving material from the channel, and the wiping element contacting an article entering or leaving the article ingress/egress aperture and applying material to the article.

In another aspect the invention provide a bovine germicidal teat dip applicator apparatus, comprising:

(a) a body having an interior cavity, a teat ingress/egress aperture, a teat dip input and a plurality of channels for conveying teat dip from the teat dip input to the teat ingress/egress aperture, wherein:
  (i) the body comprises an outer element and an inner element disposed within the outer element, and wherein the at least one channel is formed between the outer element and the inner element, and
  (ii) a reservoir disposed between the inner and outer elements, the at least one channel extending from the reservoir to the teat ingress/egress aperture, the teat dip input being communicatively connected to the reservoir;

(b) a wiping element disposed near the teat ingress/egress aperture, the wiping element receiving material from the channels, and the wiping element contacting an teat entering or leaving the teat ingress/egress aperture and applying teat dip to the teat; and (c) a cap communicatively connected to the body at the teat ingress/egress aperture, the cap comprising a teat dip distribution cavity surrounding the teat ingress/egress aperture, the channels being communicatively connected to the teat dip distribution cavity and the wiping device receiving teat dip from the teat dip distribution cavity.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 5 is a perspective view of an embodiment of a main, outside cup member of the applicator device.

FIG. 6 is a front view of the outside cup member.

FIG. 7 is a end view of the outside cup member.

FIG. 8 is a side view of the outside cup member.

FIG. 9 is a crossectional view of the outside cup member taken along line 9-9 of FIG. 10.

FIG. 10 is a top view of the outside cup member.

FIG. 11 is a detailed view of the area designated—11—in FIG. 9.

FIG. 12 is a perspective view of an embodiment of an inside cup member of the applicator device, which is particularly useful for applying medicament to the teat of a cow prior to milking (Pre).

FIG. 13 is a side view of the inside cup member.

FIG. 14 is a bottom view of the inside cup member.

FIG. 15 is a top view of the inside cup member.

FIG. 16 is a crossectional view of the inside cup member taken along line 16-16 of FIG. 15.

FIG. 17 is a detailed view of the region designated—17—in FIG. 16.

FIG. 18 is a perspective view of an embodiment of a cap member of the applicator device.

FIG. 19 is a bottom view of the cap member.

FIG. 20 is an end view of the cap member.

FIG. 21 is an opposite end view of the cap member.

FIG. 22 is a crossectional view taken along line—22-22 of FIG. 19.

FIG. 23 is a detailed view of the area designated—23—in FIG. 22.

FIG. 24 is a perspective view of an embodiment of a wiper member of the applicator device.

FIG. 25 is an alternative embodiment of the inside cup member of the applicator device, which is particularly useful for dosing after milking (Post).

FIG. 26 is a side view of the inside cup member.

FIG. 27 is a bottom view of the inside cup member.

FIG. 28 is a top view of the inside cup member.

FIG. 29 is a crossectional view of the inside cup member taken along line 29-29 of FIG. 28.

FIG. 30 is a detailed view of the region designated—30—in FIG. 29.

FIG. 31 is a perspective view of an alternative embodiment of a cap member of the applicator device for use with the inside cup member of FIGS. 25-30.

FIG. 32 is a bottom view of the cap member.

FIG. 33 is an end view of the cap member.

FIG. 34 is an opposite end view of the cap member.

FIG. 35 is a crossectional view taken along line—35-35 of FIG. 32.

FIG. 36 is a detailed view of the area designated—36—in FIG. 35.

FIG. 43 is a front view of another embodiment of the applicator device of the present invention which is useable with a powered medicament supply and delivery system.

FIG. 44 is a top view of the applicator device of FIG. 43.

FIG. 46 is a front view of an embodiment of a cap member of the powered device.

FIG. 47 is an end view of the cap member.

FIG. 48 is a top view of the cap member.

FIG. 49 is a top view of an embodiment of a handle member of the powered device.

FIG. 50 is a front view of the handle member.

FIG. 51 is an end view of the handle member.

FIG. 52 is an opposite end view of the handle member.

FIG. 53 a further end view of the handle member.

DETAILED DESCRIPTION

Figure 1A:
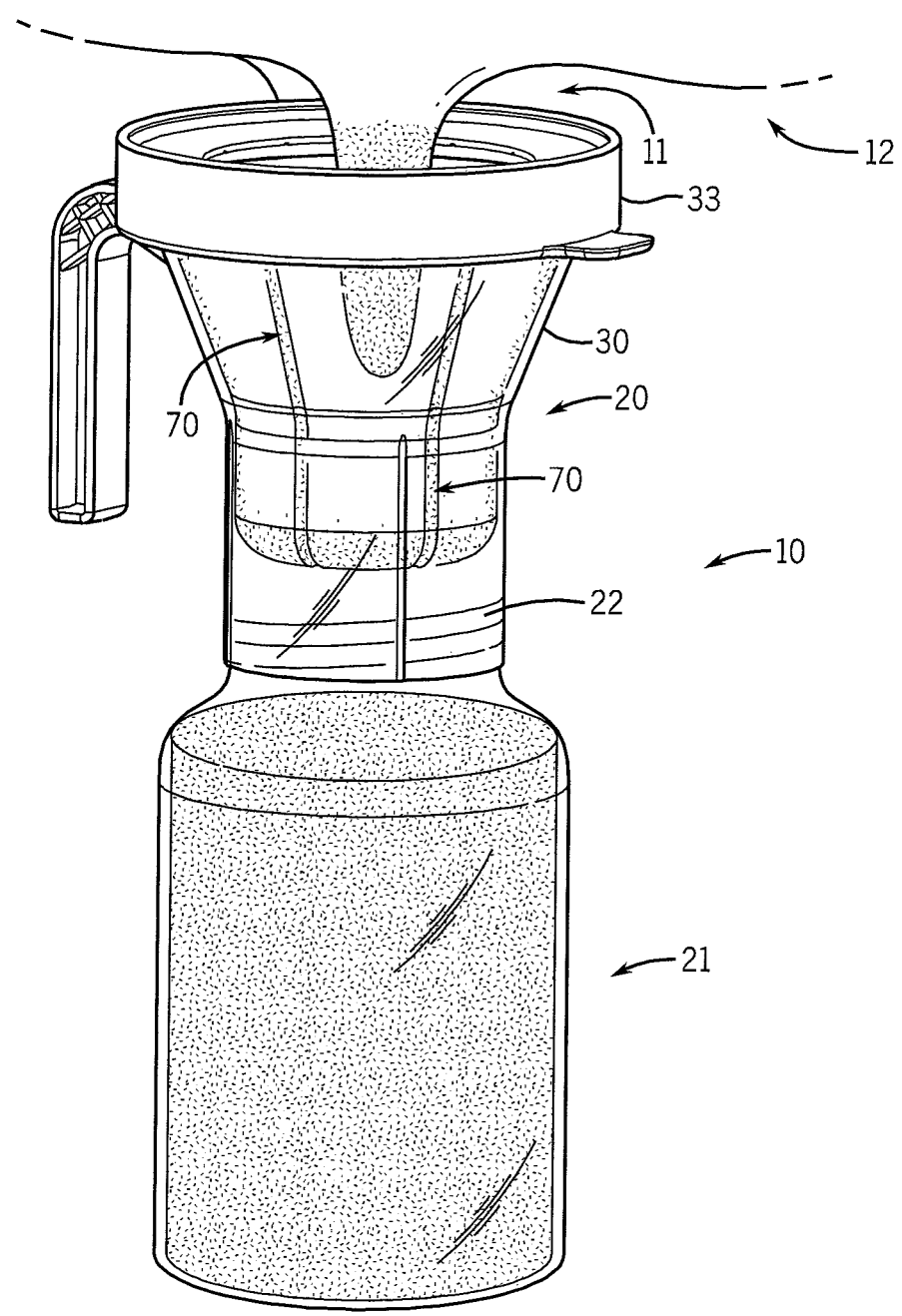
FIG. 1A is illustrates an embodiment of the germicidal teat dip applicator device of the present invention in use.
Figure 1B:
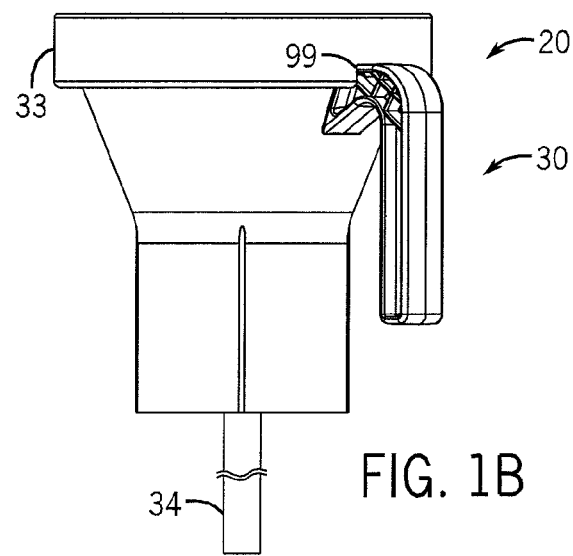
FIG. 1B is a front, elevation view of the applicator device with the squeeze bottle member removed to show the draw tube.

FIG. 1 shows an embodiment of the bovine germicide application apparatus 10 of the present invention. The apparatus 10 generally comprises an applicator assembly 20 and a germicide source 21, preferably in the form of a squeeze bottle. The apparatus 10 is shown engaging a teat 11 of an udder 12 of a cow. The apparatus 10 is hand holdable and actuatable. Germicide or another medicament or fluid is contained in the bottle 21. The bottle is squeezed by hand by the user and, as is described in detail below, germicide flows upwardly into the applicator 20. Germicide is applied to the teat 11 during engagement and in static state shown. As the apparatus 10 is removed, the entire teat 11 is further coated by germicide and simultaneously substantially all excess germicide is removed from the teat and re-captured by the apparatus 10. The bottle 21 is preferably constructed of a polymeric material such as polyethylene (preferably clear or translucent) which is flexible. Bottles of differing degrees of flexibility may be provided to accommodate the user's hand size and strength, and other actuation factors. The bottle 21 preferably has a volume of approximately 250 ml.

Figure 3:
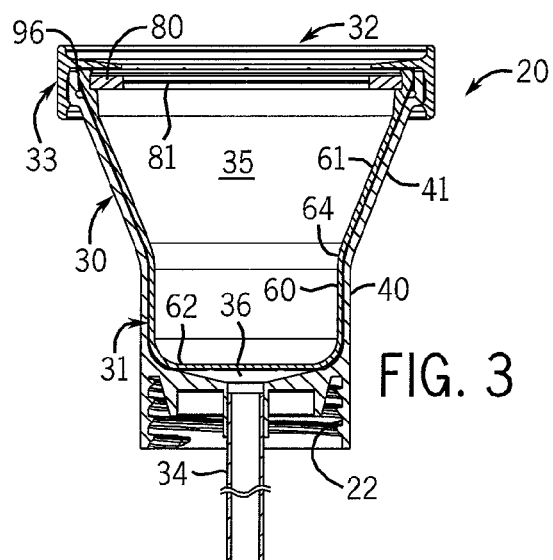
FIG. 3 is a crossectional view of the applicator device taken along line 3-3 of FIG. 2.
Figure 2:
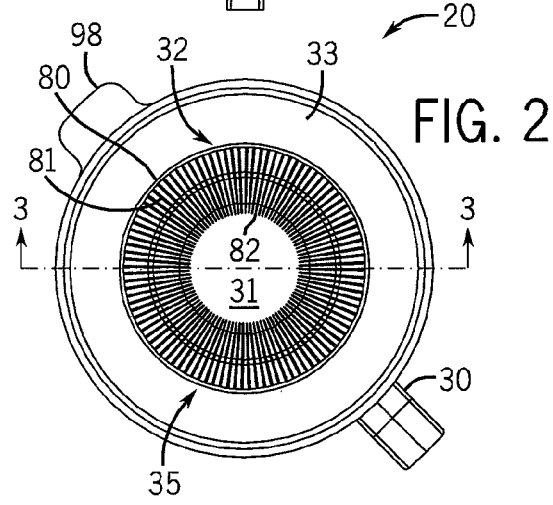
FIG. 2 is a top view of the applicator device.
Figure 4:
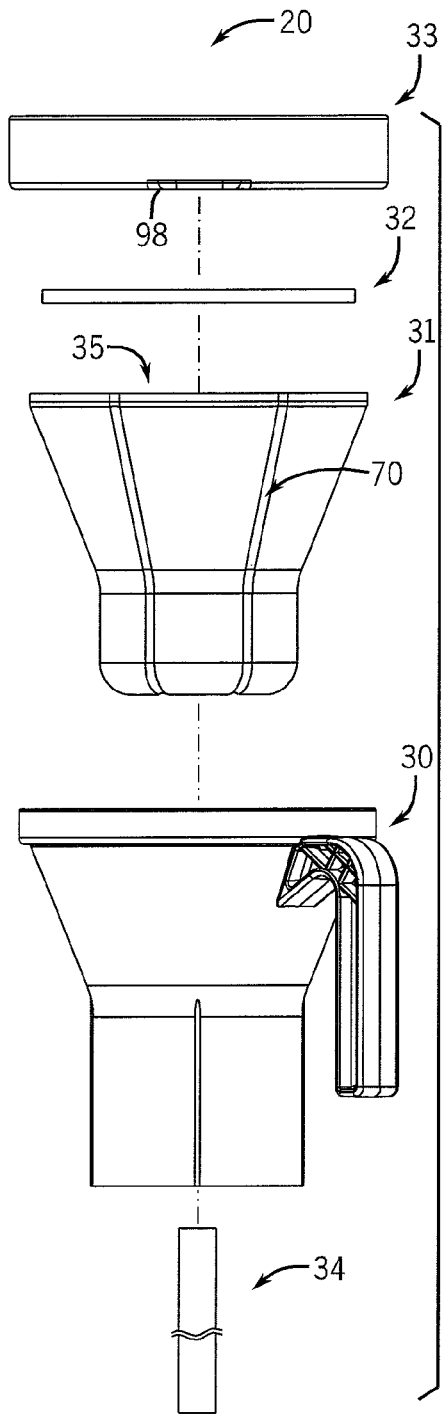
FIG. 4 is an exploded view of the applicator device, without the bottle member.
Figure 37:
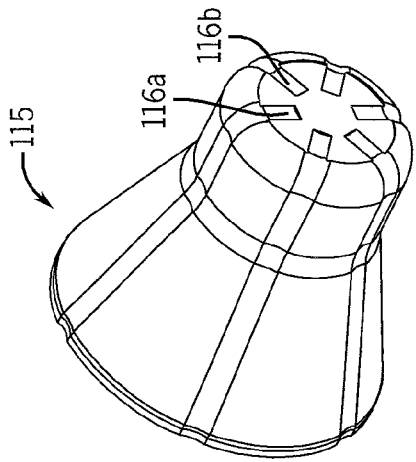
FIG. 37 is a further alternative embodiment of the inside cup member of the applicator device, having longitudinal fluid channels that extend further downwardly on the cup.
Figure 38:
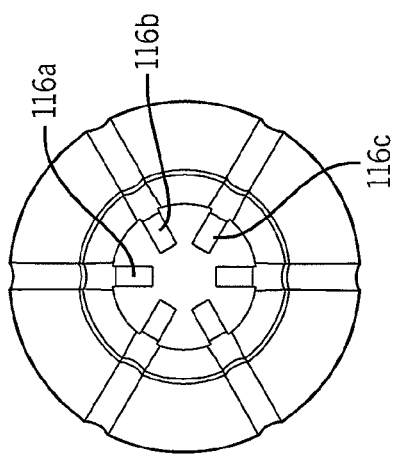
FIG. 38 is a side view of the inside cup member.
Figure 39:
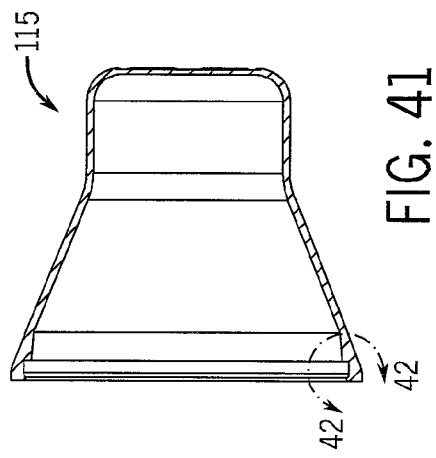
FIG. 39 is a bottom view of the inside cup member.
Figure 41:
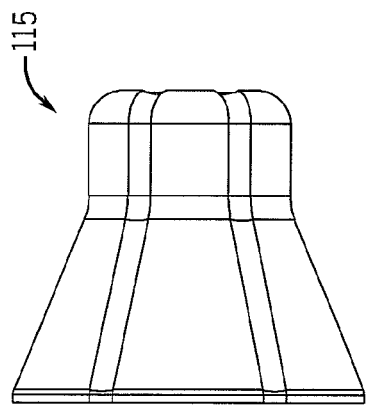
FIG. 41 is a crossectional view of the inside cup member taken along line 41-41 of FIG. 40.
Figure 42:
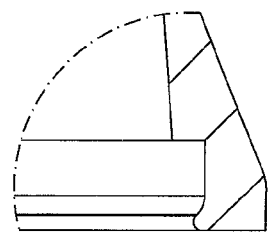
FIG. 42 is a detailed view of the region designated—42— in FIG. 41.
Figure 40:
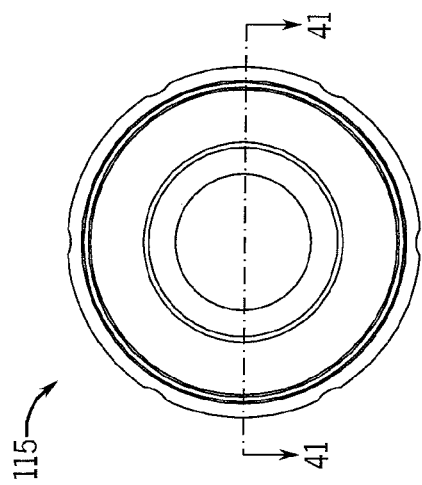
FIG. 40 is a top view of the inside cup member.
Figure 45:
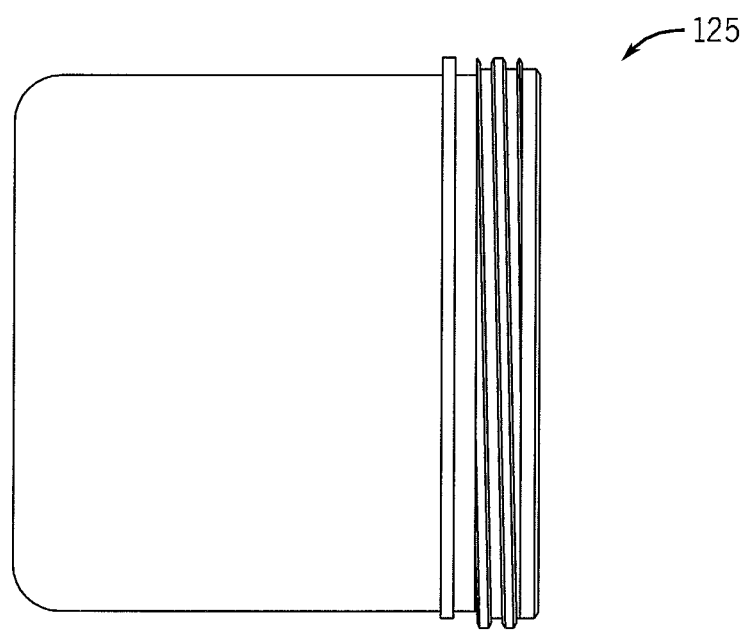
FIG. 45 is a front view of an embodiment of a cup member of the powered device.
Figure 54:
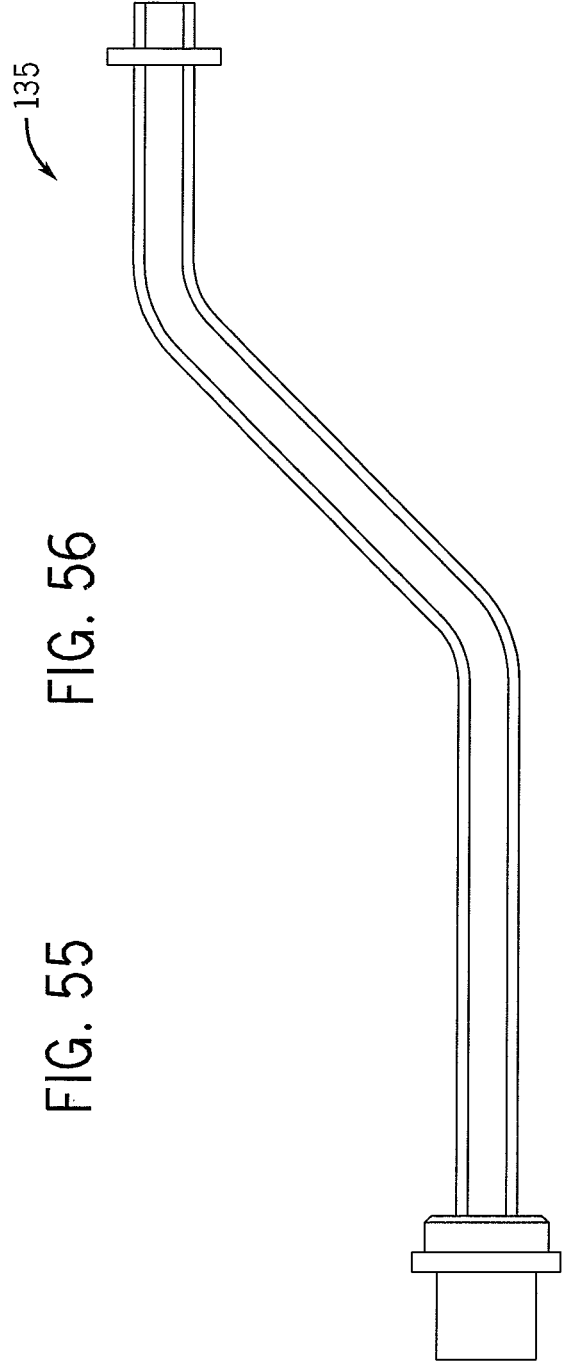
FIG. 54 is a front view of an embodiment of a supply conduit of the powered applicator device.
Figure 56:
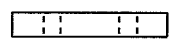
FIG. 56 is a side view of the gasket.
Figure 55:
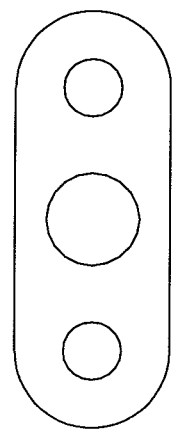
FIG. 55 is a front view of a gasket of the handle member.
Figure 59:
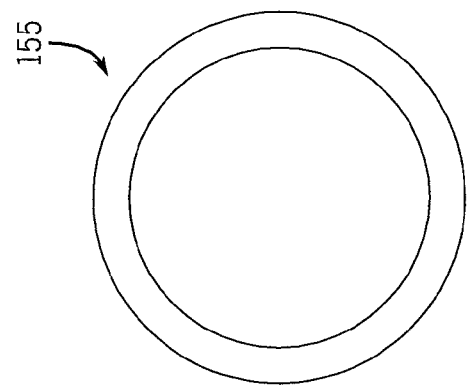
FIG. 59 is a top view of a gasket for use with the cap and cup of FIGS. 57 and 58.
Figure 60:
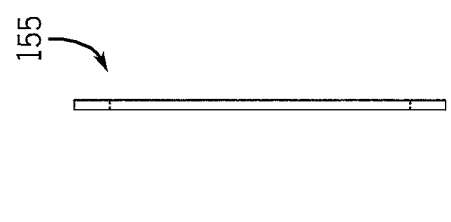
FIG. 60 is a side view of the gasket.
Figure 58:
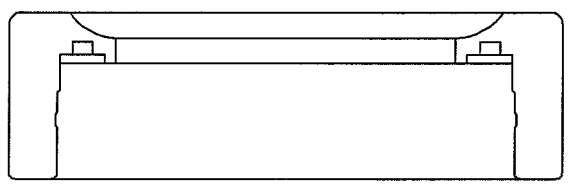
FIG. 58 is a front view of an alternative embodiment of the cap for use with the powered device.
Figure 57:
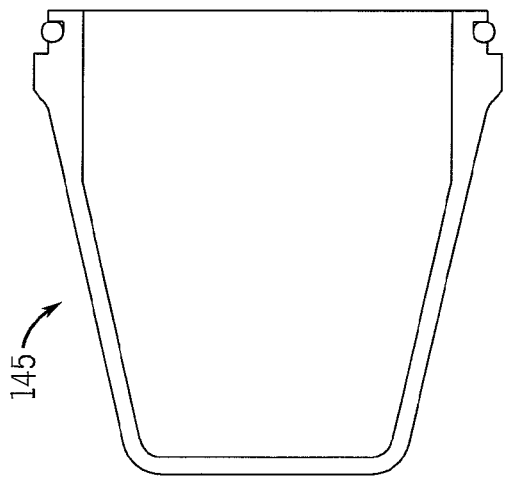
FIG. 57 is a front view of an alternative embodiment of the cup for use with the powered device.

Referring also to FIGS. 2-4, the applicator assembly 20 comprises an upper, outer cup member 30, inner cup member or catch cup 31, a brush or wiper assembly 32, a cap or ring member 33, and a delivery tube 34. The bottom end of the outer member 30 releasably connected, preferably by screw threaded connection 22, to the top of the squeeze bottle 21. The deliver or draw tube 34 is connected to (preferably via a friction fit) and extends from the bottom of the outer member 30. It has a predetermined length which extends into the bottle 21 to a point near the interior bottom to maximize contact with fluid in the bottle 21. The top end of the outer member 30 is open ended and receives the inner cup 31. The wiping member 32 is placed on top of the inner cup 31. And the cap 33 is place over the open top of the outer member 30.

As is best shown in FIG. 3, in an operative state, the inner cup 31 is retained completely within the outer member 30. Further, the lateral inside dimensions of the outer member 30 is substantially the same dimension as the lateral outside dimensions of the inner cup 31 such that they are laterally tightly, sealing fit together. The inner cup 31 has an open top and a teat cavity 35 of a predetermined dimension to receive and accommodate the teat 11. The bottom end of the inner cup 31 rests above the bottom of the interior of the outer member 30 to thereby form a dip chamber or reservoir 36. Compression of the squeeze bottle 21 causes fluid to travel up the draw tube and into the chamber 36. From there, it travels up vertical fluid delivery channels formed by grooves 70 in the inner cup 31. Fluid travels upwardly and substantially longitudinally to the cap 33 where it is distributed laterally inwardly and then over the wiping device 31, also as described and shown further below. The wiping device 31 applies fluid to the teat 11 both during placement on the teat 11 (engagement) and during retraction (removal) from the teat 11. Excess fluid wiped off of the teat 11 by the wiper 32 drops into the inner cavity 35 of the inner cup 31 where it may be applied to succeeding teats 11. The inner and outer members 31 and 30 are preferably constructed of a clear or substantially clear material so that the user can visualize contact with the teat 11 and movement of fluid. Most preferably, the bottle 21 is also clear so that the user can monitor fluid supply level.

Referring also to FIGS. 5-11, the outer member 30 preferably has a handle 43. The outer member 30 is preferably constructed of a polymeric material, preferably copolymer of polypropylene. It is also preferably constructed via a molding process. The outer member 30 is shown to have cylindrical lower portion 40, a tapered middle portion 41 and a short conical upper portion 42. These form open topped interior cavity 55 with lateral inside dimensions substantially equivalent to the outside lateral dimensions of the inner cup 31. The upper portion 42 has an flat upper edge 56 that sealingly mates with the cap 33. On the interior side of the member 30 the upper portion has a recess ring 57 that cooperates with the cap 33 to distribute fluid around the entirety of the upper end of the device 20. FIGS. 9 and 11 shows the bottom of the outer member 30 having a recess 50 with female threads 51 for engagement with the male threads 22 of the bottle 21. Ring 52 aids in sealing the connection between the bottle 21 and the outer member 30. Draw tube connector 53 with aperture 54 are disposed at the bottom and connect to draw tube 34.

Figure 63:
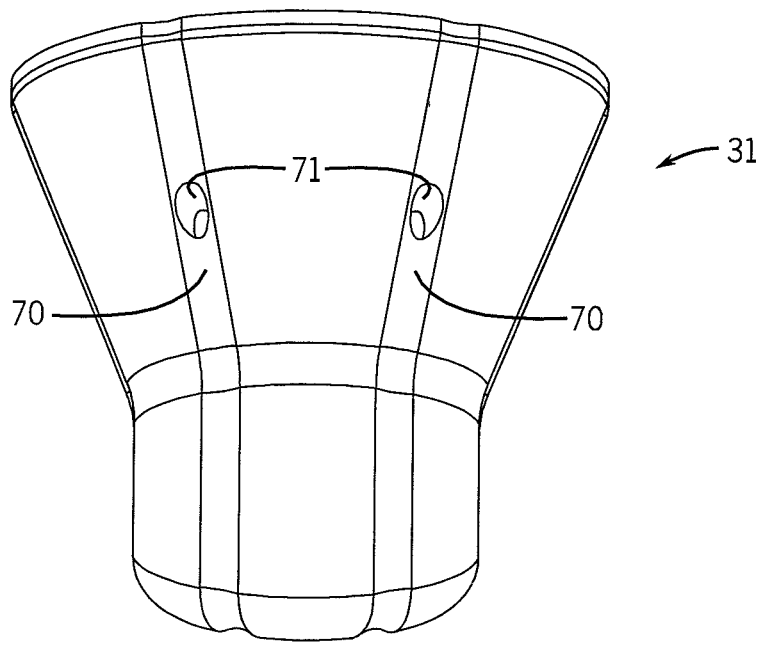
FIG. 63 illustrates still another embodiment of the inner cap member the applicator device.

FIGS. 12-17 show the inner member 31, which is also preferably constructed of a polymeric material, preferably copolymer of polypropylene. It is also preferably constructed via a molding process. The inner member 31 is shown to have cylindrical lower portion 60, upper radiused throat 64, a tapered upper portion 61, lower radius edge 63, and a generally flat bottom 62. These form open topped interior cavity 35 with lateral outside dimensions substantially equivalent to the inside lateral dimensions of the outer cup 30. The upper portion 61 has a short cylindrical area 65 terminating in a flat upper edge 66 that also sealingly mates with the cap 33. As is best shown in FIG. 17, the interior side of the upper portion 61/65 has a fluid recess ring formed by inset edge 68 and the interior lateral wall above it extending to detent ring 69 that cooperates with the cap 33 to distribute fluid around the entirety of the upper end of the device 20. When the outside of wall 65 abuts the inside of wall 42 of outer cup 30, recess 57 forms fluid channel 96 shown in FIG. 3. Vertical, longitudinal grooves 70a-f in the outside wall extend from the bottom 62 to the top 65. When the inner cup 31 is operatively disposed in the outer cup 30, the grooves 70 define fluid channels extending from the dip reservoir 36 to the fluid recess ring (formed at 68/69). The grooves shown have dimensions for metering germicide fluid (for example an iodine based composition) for treatment of teats prior to milking, also known as pre-treatment. Since the cavity 35 is closed with respect to the channels 70, teat dip enters the cavity by excess dip being wiped from the teat 11 by the brushes 33 upon retraction of the device 10. Alternatively, referring to FIG. 63, one or more apertures 71 may be deployed in each groove/channel 70 to permit some fluid being pumped upwardly to enter the cavity 35 directly. Fluid in the cavity 35 is then used to further coat the teat 11. The placement of the aperture 71 may be varied vertically to control the amount or level of the liquid in the cavity 35. For example, a higher aperture 71 along the length of the channel 70 permits a higher level of liquid in the cavity 35 and a lower placement will lower the level.

Referring also to FIG. 24, the brush or wiper assembly 32 is disposed on the top of the inner member 31. The brush assembly 32 preferably has an outer ring 80 and a plurality or array of flexible bristles 81 which extend radially inwardly from the outer ring 80. The bristles 81 terminate inwardly to form a central teat receiving aperture 82. The ring 80 may be constructed of metal, such as stainless steel. The ring 80 may be split or continuous. The ring 80 is operatively placed on edge 68 of inner cup 31. Example wiper assemblies 32 are disclosed in U.S. Pat. Nos. 7,165,510 and 7,387,086, which are hereby incorporated by reference. The bristles 81 receive fluid at their outer circumference and top, outward end, pumped from reservoir bottle 21 and convey it inwardly to be applied to passing teat 11 skin.

The cap or ring member 33 is shown in further detail in FIGS. 18-23. The cap is also preferably constructed of polypropylene. Cap 33 is disposed over the assembly of outer cup, inner cup and wiping member 30/31/32 and holds them together and in place. Cap 33 has a circular configuration with a bottom end 91 for connection to the remaining elements of the assembly 20 and a top end 90 for engagement with a teat 11. The cap 16 has a circular, vertical outer wall 92 and inwardly extending flat, horizontal wall 96. Wall 96 has a central aperture 97. As is best shown in FIGS. 22 and 23, the interior surface 94 of wall 92 extends vertically to horizontal wall 96. Wall 96 has a flat ring surface area 96 which sealingly mates with edges 56 and 66 of outer and inner cups 30 and 31 respectively as shown in FIG. 3. Inwardly extending detent ring 95 creates a circumferential fluid distribution channel for fluid pumped upwardly in channels 70. Radially, inwardly oriented grooves 100a-l in wall 96 form fluid delivery veins which direct fluid inwardly therefrom over the top surface of wiper 32. The veins 100 shown have dimensions to cooperate with the channels 70 of inner cup 31 for pre-treatment.

Handle or tab 98 extends from the bottom of the side wall 92 to aid in connection and disconnection from the assembly 20. Notch 99 is shown disposed in side wall 92 and is aligned to permit connection of handle 43 of outer member 30.

In summary, in use, the teat of a cow is inserted through the brushes 32. The outer member 30 holds the channeled inner insert cup 31 which in turn channels teat disinfectant longitudinally to the brushes 32 by way of an annular reservoir contained within the periphery of the snap on top 33. The body 20 of the apparatus 10 is in turn connected to the squeezable bottle 21. When the bottle 21 is squeezed, it delivers fluid disinfectant through the tube 34 into the space 36 at the bottom of the assembly 20 between the inner and outer members 30 an 31, then through the longitudinal channels 70, then into the top circumferential channel, and then to the radial veins 100, and finally onto the application brushes 32.

FIGS. 25-30 show an alternative embodiment of the inner cup 105. The cup 105 has a substantially similar construction, arrangement and dimensions to those of inner cup 31 described above except that longitudinal/vertical grooves 106a-f have larger dimensions for metering more germicide/conditioner fluid for treatment of teats after milking, also known as post-treatment.

FIGS. 31-36 show an alternative embodiment of the cap 110. The cap 110 has a substantially similar construction, arrangement and dimensions to those of cap 33 described above except that radial veins 111a-l have dimensions (larger) to cooperate with the channels 106 of inner cup 105 for post-treatment.

FIGS. 37-42 show an alternative embodiment of the inner cup 115. The cup 115 has a substantially similar construction, arrangement and dimensions to those of inner cups 31 and 105 described above except that longitudinal/vertical grooves 116a-f extend all of the way to the bottom of the cup.

With respect to fluid supply, the squeeze bottle 21 may be replaced by other fluid sources and delivery systems including a hand held lever actuated valve that is connected to a hose by a pressurized pump. FIGS. 44-55 show a powered pumping system 120 for use with standard wiping assemblies and inner cups described above, including an outer cup or body 125, a cap 130, a handle assembly 140, and a delivery conduit assembly 135. FIGS. 57-60 show alternative embodiments of the outer cup 145, cap 150 and washer 155 for powered fluid delivery.

Figure 61B:
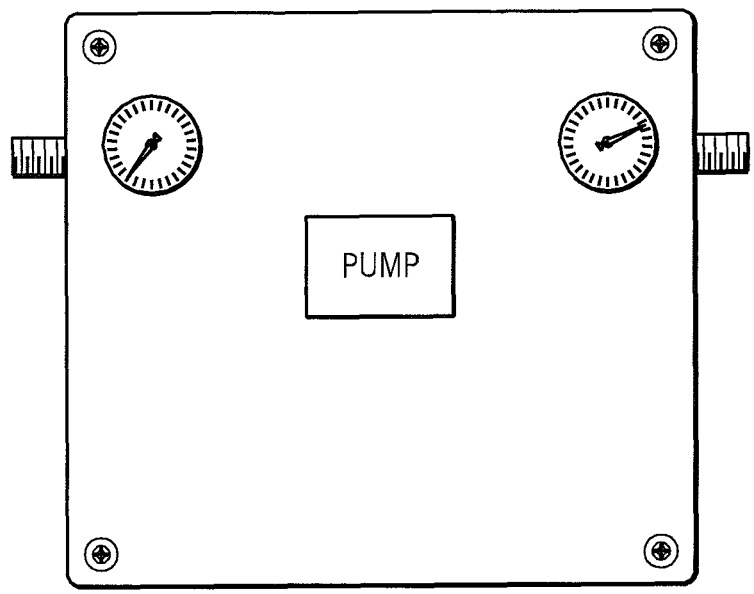
FIGS. 61A and B illustrate yet another embodiment of the applicator device and system for applying form-type medicament, particular form teat dip.
Figure 61A:
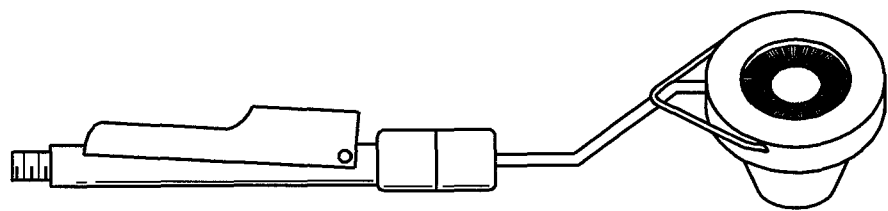
Figure 62A:
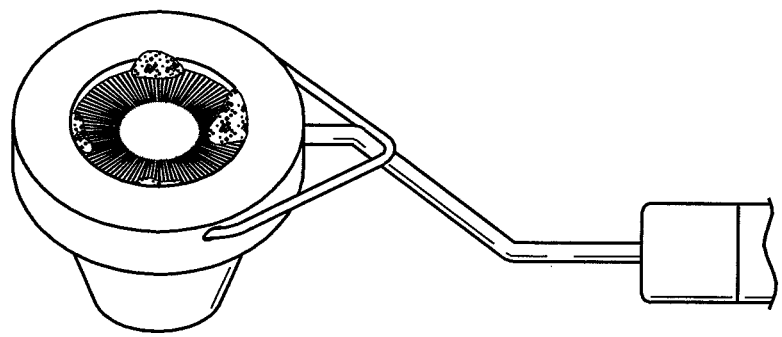
FIGS. 62A and B illustrate delivery of foam teat dip via the applicator system.
Figure 62B:
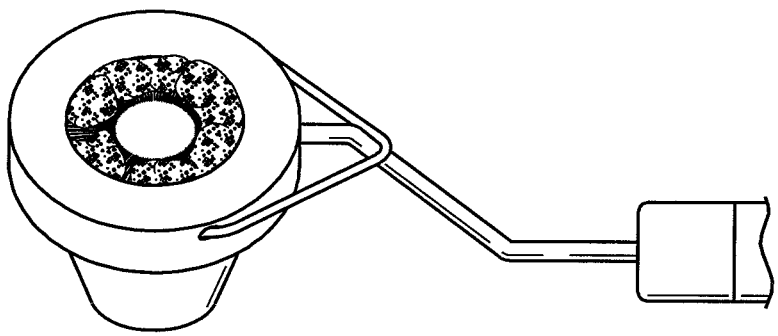

The teachings of this invention for liquid teat dips and other liquid compositions are also applicable to foam germicides and compositions. FIGS. 61 and 62 show a system for foam application including outer cups, inner cups, wiping device disclosed above, and further including a foam pump, regulator and mixing valve. Foam oozes on top of the brushes.

The advantages of the invention include, but are not limited to:

1) The apparatus provides substantially 100% teat dip coverage on the skin of the teat.
2) The operator never carries a catch cup full of dip which is easily spilled. The apparatus can be turned upside down and never spill more than a few drops of fluid.
3) By applying teat dip to the topside of the wiper it makes the apparatus a minimum of 50% more economical in teat dip usage than the known devices.
4) Its unique design allows the operator to see through the transparent upper, outer chamber and inner catch cup so that he can see that a minimal amount of teat dip is being collected in the catch cup. This is vital information to the saving of teat dip.
5) Because of its unique design, if the operator excessively squeezes the bottle and applies an excess of dip to the top of the wiper, as soon as the pressure is released from the bottle, the excess dip is retrieved back into the upper chamber by the negative pressure created in the bottle.

6) The outer ridge of the exterior on the cap is elevated so that any excess dip is retained on the brush and not spilled.
7) The catch cup is uniquely designed to catch excess drips and excess application to the top of the wiper. That dip can be used to rehydrate the wiper by laying the dip cup horizontally in your hand and rotating. Therefore, dip is never wasted.
8) Each bottle of fluid will treat approximately 150 cows.
9) The transparent upper chambers give vital information to managing savings. Teat dip originates from the top of the brush and paints the dip on the teats, which is new and unique.

Although the apparatus 10 is described with respect to delivery of a germicide, it is within the purview of the invention that it can deliver other fluids.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. An apparatus comprising:
   a) a body having an interior cavity, an article ingress/egress aperture, a material input and at least one channel for conveying material from the material input to the article ingress/egress aperture, wherein the body comprises an outer element and an inner element disposed within the outer element, wherein the at least one channel is formed between the outer element and the inner element, wherein the outer element has a wall structure, a first end of the wall structure wherein the material input is disposed and a second end of the wall structure wherein the article ingress/egress aperture is disposed, and wherein the inner element has a closed wall structure with an article ingress/egress aperture aligned with the article ingress/egress aperture of the outer element, the interior cavity being disposed within the inner article; and
   b) a wiping element disposed near the article ingress/egress aperture, the wiping element receiving material from the channel, and the wiping element being adapted to contact an article entering or leaving the article ingress/egress aperture and applying material to the article.

2. The apparatus of claim 1, wherein the article is a teat of a cow, wherein the material is a bovine germicidal teat dip composition, and wherein, in use, the apparatus applies the teat dip composition to the teat upon the teat entering or leaving the interior cavity via the teat ingress/egress aperture.

3. The apparatus of claim 1, wherein the body has a wall structure, a first end of the wall structure wherein the material input is disposed, a second end of the wall structure wherein the article ingress/egress aperture is disposed and wherein the at least one channel is communicatively connected to the wall structure.

4. The apparatus of claim 1, wherein the at least one channel comprises a groove disposed in an outer side of the wall structure of the inner element.

5. The apparatus of claim 4, wherein the outer element wall has a predetermined first inside dimension, wherein the inner element wall has a predetermined first outside dimension, and wherein the first inside dimension of the outer wall element is substantially equivalent to the first outside dimension of the inner wall element whereby the inner element sealingly fits in the first dimension of the outer element.

6. The apparatus of claim 5, further comprising a reservoir between the inner and outer elements, the at least one channel extending from the reservoir to the article ingress/egress aperture, the material input being communicatively connected to the reservoir.

7. The apparatus of claim 1, wherein the body has a material distribution cavity surrounding the article ingress/egress aperture, the at least one channel being communicatively connected to the material distribution cavity and the wiping device receiving material from the material distribution cavity.

8. The apparatus of claim 1, wherein the material input comprises a hose.

9. The apparatus of claim 8, further comprising a squeezable bottle for containing material and being sealingly connected to the hose.

10. The apparatus of claim 8, further comprising a pump powered material delivery system connected to the hose.

11. The apparatus of claim 1, wherein the wiping element comprises an array of flexible brushes.

12. The apparatus of claim 1, wherein the wiping element surrounds the article ingress/egress aperture.

13. The apparatus of claim 1, further comprising a cap communicatively connected to the body at the article ingress/egress aperture, the cap comprising a material distribution cavity surrounding the article ingress/egress aperture, the at least one channel being communicatively connected to the material distribution cavity and the wiping device receiving material from the material distribution cavity.

14. The apparatus of claim 13, wherein the body has a portion of the material distribution cavity and wherein the cap has a mating, cooperating portion of the material distribution cavity.

15. The apparatus of claim 13 wherein the cap holds the wiping device to the body.

16. The apparatus of claim 13, wherein the cap and wiping device are connectible and disconnectible to the body.

17. A fluid applicator apparatus for applying fluid material to an article comprising:
   (a) a body having an interior cavity, an article ingress/egress aperture, a material input and at least one channel for conveying material from the material input to the article ingress/egress aperture, the body comprising (i) further a reservoir, the at least one channel extending from the reservoir to the article ingress/egress aperture, the material input being communicatively connected to the reservoir, and (ii) a material distribution cavity surrounding the article ingress/egress aperture, the at least one channel being communicatively connected to the material distribution cavity and the wiping device receiving material from the material distribution cavity; and
   (b) a wiping element disposed near the article ingress/egress aperture, the wiping element receiving material from the channel, and the wiping element being adapted to contact an article entering or leaving the article ingress/egress aperture and applying material to the article.

18. A bovine germicidal teat dip applicator apparatus, comprising:
(a) a body having an interior cavity, a teat ingress/egress aperture, a teat dip input and a plurality of channels for conveying teat dip from the teat dip input to the teat ingress/egress aperture, wherein:
  (i) the body comprises an outer element and an inner element disposed within the outer element, and wherein the channels are formed between the outer element and the inner element, and
  (ii) a reservoir disposed between the inner and outer elements, the at least one channel extending from the reservoir to the teat ingress/egress aperture, the teat dip input being communicatively connected to the reservoir;
(b) a wiping element disposed near the teat ingress/egress aperture, the wiping element receiving material from the channels, and the wiping element being adapted to contact a teat entering or leaving the teat ingress/egress aperture and applying teat dip to the teat; and
(c) a cap communicatively connected to the body at the teat ingress/egress aperture, the cap comprising a teat dip distribution cavity surrounding the teat ingress/egress aperture, the channels being communicatively connected to the teat dip distribution cavity and the wiping device receiving teat dip from the teat dip distribution cavity.

19. An apparatus comprising a body having an interior cavity, an article ingress/egress aperture, a material input and at least one channel for conveying material from the material input to the article ingress/egress aperture, and a wiping element disposed near the article ingress/egress aperture, the wiping element receiving material from the channel, and the wiping element being adapted to contact an article entering or leaving the article ingress/egress aperture and applying material to the article, wherein the body has a material distribution cavity surrounding the article ingress/egress aperture, the at least one channel being communicatively connected to the material distribution cavity and the wiping device receiving material from the material distribution cavity.

20. An apparatus comprising a body having an interior cavity, an article ingress/egress aperture, a material input and at least one channel for conveying material from the material input to the article ingress/egress aperture, and a wiping element disposed near the article ingress/egress aperture, the wiping element receiving material from the channel, and the wiping element being adapted to contact an article entering or leaving the article ingress/egress aperture and applying material to the article, the apparatus further comprising a cap communicatively connected to the body at the article ingress/egress aperture, the cap comprising a material distribution cavity surrounding the article ingress/egress aperture, the at least one channel being communicatively connected to the material distribution cavity and the wiping device receiving material from the material distribution cavity.

\* \* \* \* \*